J. CLARK.
CLAMPING RING FOR LOCK BAR PIPE COUPLINGS.
APPLICATION FILED OCT. 20, 1909.

999,547.

Patented Aug. 1, 1911.

3 SHEETS—SHEET 1.

WITNESSES

INVENTOR
James Clark

Attorneys

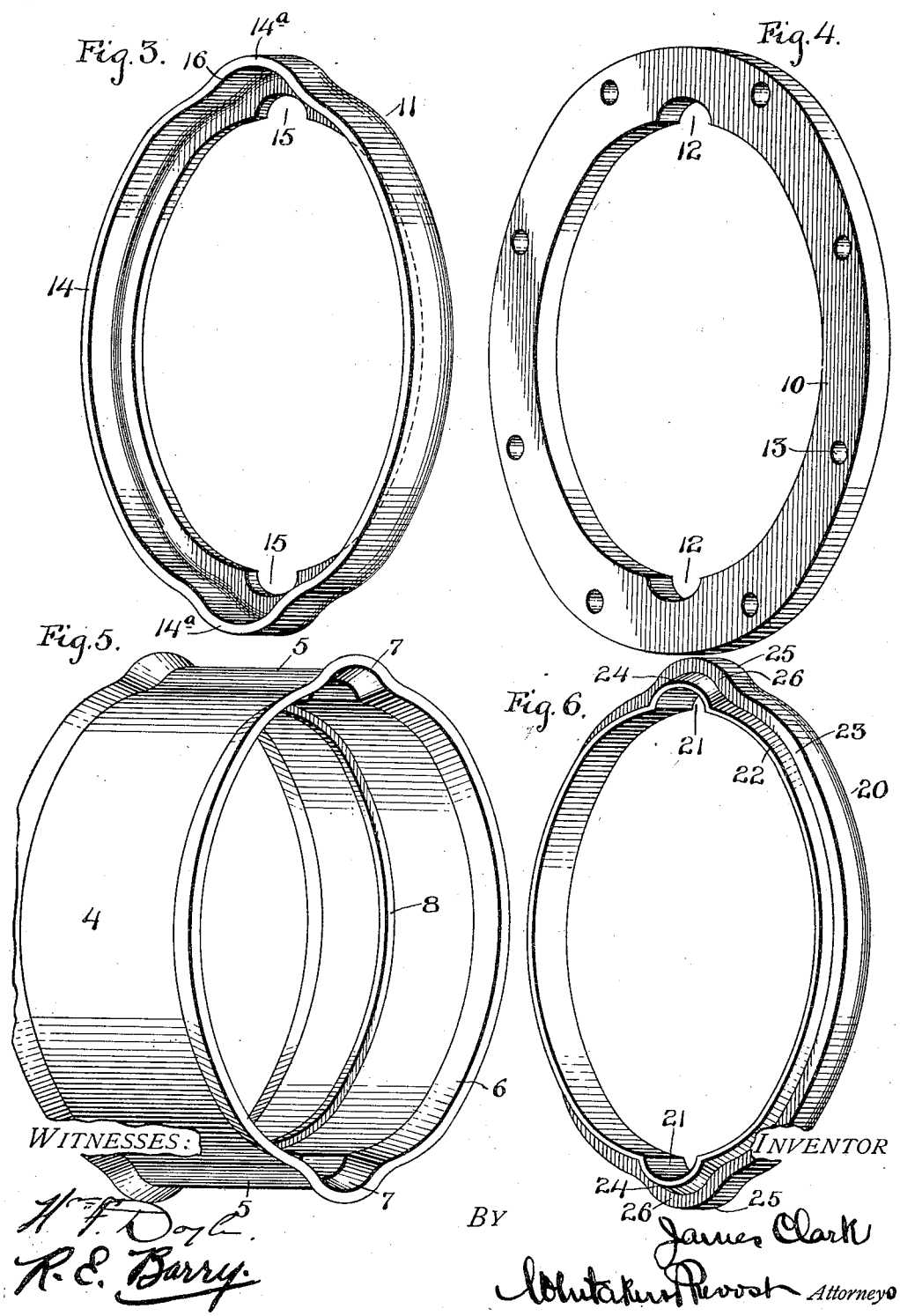

J. CLARK.
CLAMPING RING FOR LOCK BAR PIPE COUPLINGS.
APPLICATION FILED OCT. 20, 1909.
999,547.
Patented Aug. 1, 1911.
3 SHEETS—SHEET 3.
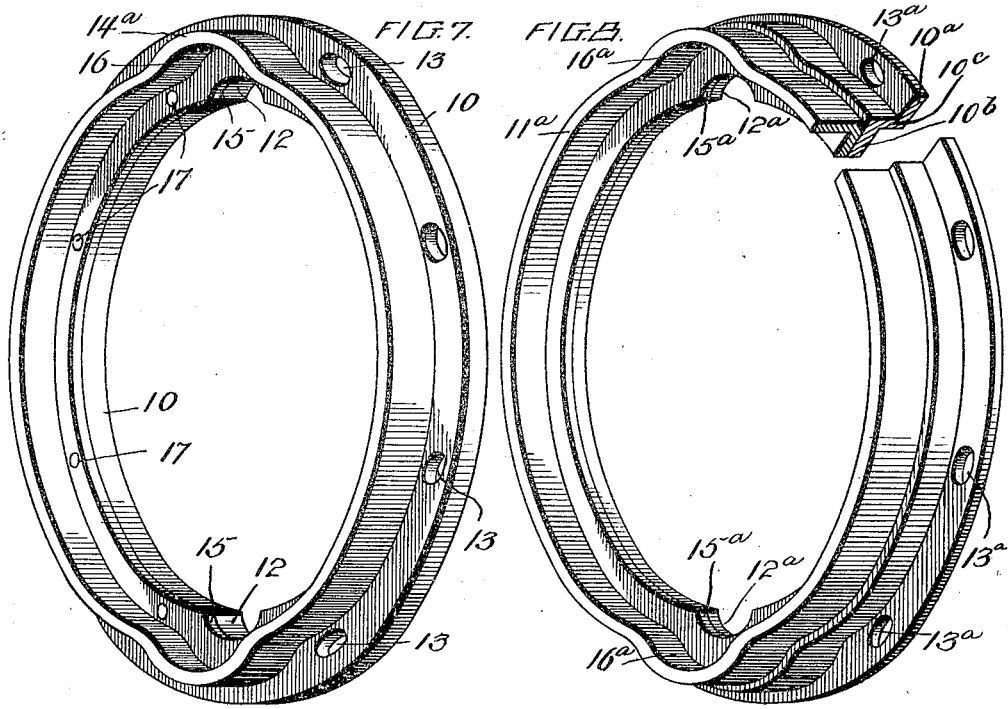
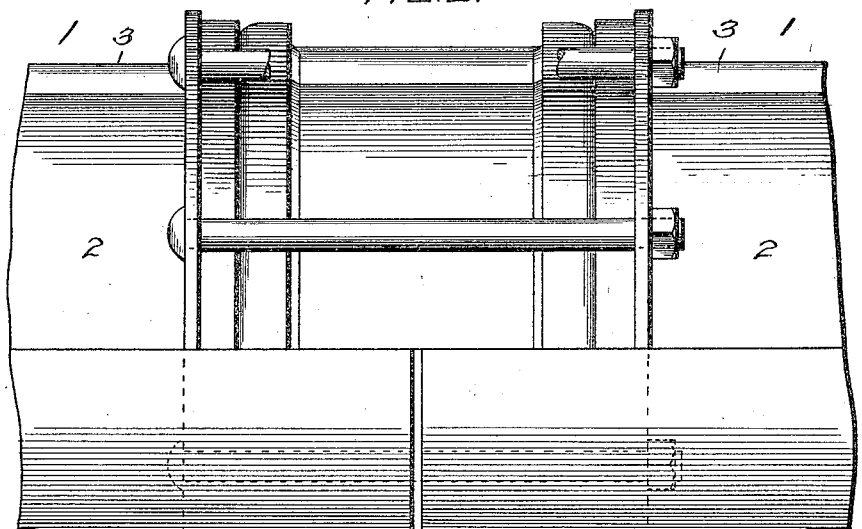
WITNESSES:
INVENTOR

UNITED STATES PATENT OFFICE.

JAMES CLARK, OF BRADFORD, PENNSYLVANIA, ASSIGNOR TO S. R. DRESSER MANUFACTURING COMPANY, OF BRADFORD, PENNSYLVANIA.

CLAMPING-RING FOR LOCK-BAR-PIPE COUPLINGS.

999,547.

Specification of Letters Patent.

Patented Aug. 1, 1911.

Application filed October 20, 1909. Serial No. 523,723.

*To all whom it may concern:*

Be it known that I, JAMES CLARK, citizen of the United States, residing at Bradford, in the county of McKean and State of Pennsylvania, have invented certain new and useful Improvements in Clamping-Rings for Lock-Bar-Pipe Couplings; and I do hereby declare the following to be a full, clear, and exact description of the invention, such as will enable others skilled in the art to which it appertains to make and use the same.

This invention relates to a coupling specially designed for connecting the ends of sections of lock-bar pipe, to form a tight joint.

In the manufacture of lock-bar pipe, plates of wrought metal are prepared of a length equal to the pipe section to be made therefrom and having their longitudinal edges trued so as to be parallel, and upset to give the plate a greater thickness at the extreme edge. The simplest form of the lock-bar pipe, which is employed for the smaller sizes is made by bending or rolling the plate into nearly a tubular or cylindrical form, and introducing the meeting upset edges into grooves formed on opposite sides of a bar, the walls of the grooves in the bar being then compressed by hydraulic pressure or otherwise upon the upset edges of the plate, thus completing the pipe. In making larger sizes of lock-bar pipe, two such plates are employed each being bent into nearly semi-cylindrical form, and having their edges connected by two lock bars as shown in the accompanying drawings. Larger sizes of lock-bar pipe are also made by employing a larger number of plates and a corresponding number of lock bars. It will be seen that the pipe sections so made are not truly circular in cross section, as the lock bars project beyond both the outer and inner walls of the pipe, and therefore the ordinary pipe couplings cannot be employed for connecting them.

My present invention has for its object to provide a special coupling for this style of pipe, and I have selected for purposes of illustration and description a coupling for pipe sections having two lock bars in each, it being understood that the coupling is adapted by slight modification for pipes having one lock bar or more than two lock bars.

My invention is fully disclosed in the following description and claims.

Figure 1:
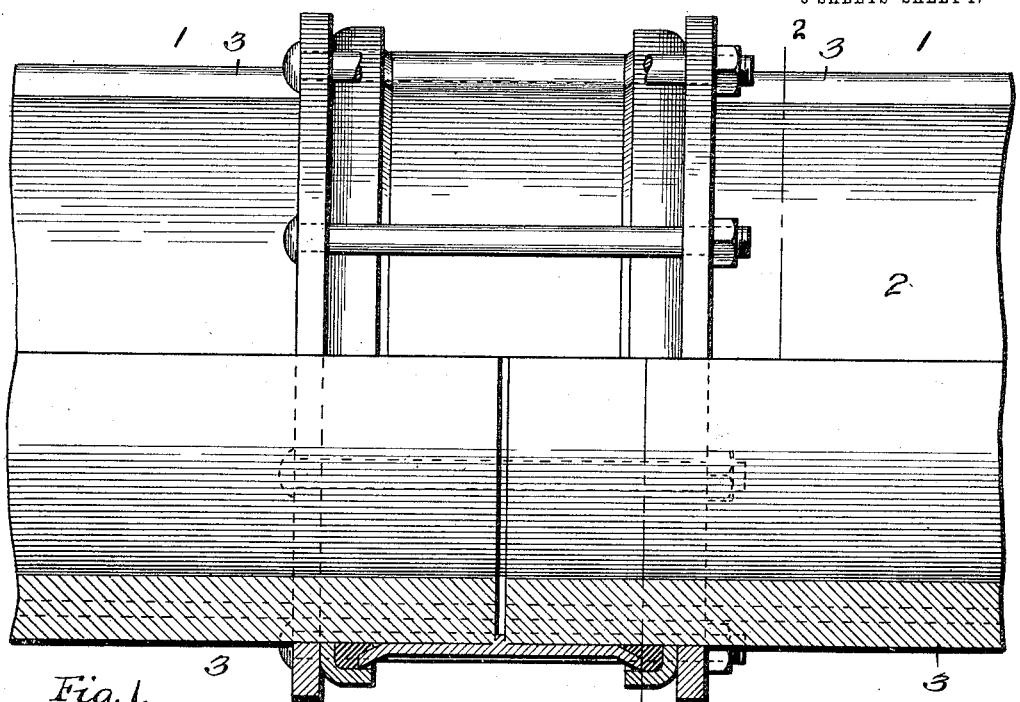
Figure 2:
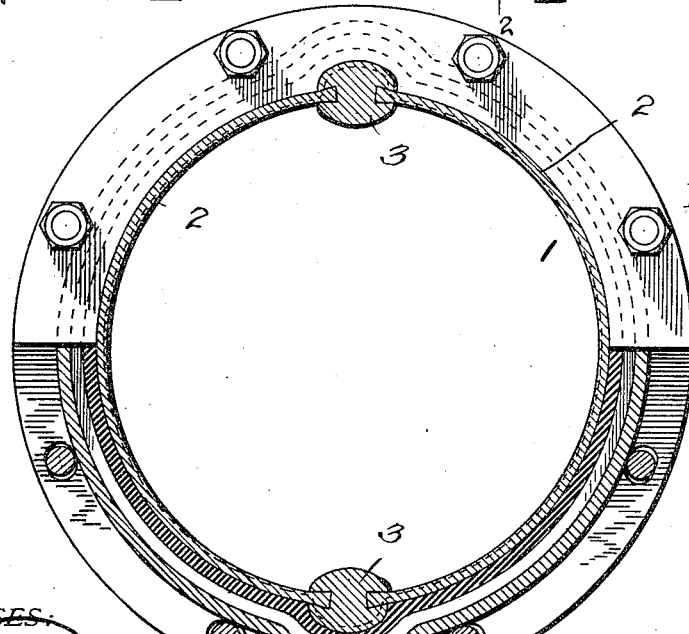

Referring to the said drawings, Figure 1 represents portions of two sections of lock-bar pipe, having their meeting ends connected by a coupling embodying my invention. Fig. 2 is a transverse sectional view taken on line 2—2 of Fig. 1. Figs. 3 and 4 are detail perspective views of the parts of one of the clamping rings of the coupling. Fig. 5 is a detail perspective view of the middle ring which I prefer to employ in connection with my improved clamping rings. Fig. 6 is a similar view of one of the packing rings. Fig. 7 is a detail perspective view of a clamping ring such as is illustrated in Figs. 3 and 4, showing the parts united. Fig. 8 is a detail perspective view partly in section of another form of clamping ring formed in two parts. Fig. 9 is a view similar to Fig. 1 showing an assembled coupling, including clamping rings of the form shown in Fig. 8.

In the accompanying drawings 1, 1 represents two sections of lock bar pipe, 2, 2 indicating the plates, and 3, 3 the lock bars. The coupling comprises a middle ring to inclose the ends of the pipe sections, and two packing rings, specially constructed to accommodate the lock-bar pipe, usually of rubber of special construction, two clamping rings of special construction and bolts and nuts for connecting the clamping rings.

In connection with the clamping rings and packing rings hereinafter described, I employ a middle ring or sleeve, to fit over the meeting ends of the pipe sections, said middle ring being provided with longitudinal grooves to accommodate the lock bars on the pipe sections, and having a packing recess at each end to receive a packing ring. The middle ring may be formed of cast or wrought metal, and in different ways. It is here shown as being formed of steel or wrought iron, as at 4, and provided with longitudinal grooves 5, and packing recesses 6, 6, each of which is provided with an outwardly curved recess 7 adjacent to each lock bar groove. The ring is also preferably provided with a centering stop 8, to center the coupling over the meeting ends of the pipes.

In Figs. 1 to 7 inclusive, I have shown a clamping ring which consists of two separate parts 10 and 11. The plate member 10 is formed from a piece of heavy bar or strip of wrought metal of greater width than thickness and having the grain of the metal extending longitudinally, which is bent into a circle in the plane of its width, or greatest transverse dimension, its ends being welded together. This plate member is shown in detail in Fig. 4 and is provided on its inner surface, which fits easily over the pipe sections, with recesses 12, 12 to accommodate the lock bars of the pipe and with bolt holes 13. The other part of flange member of the ring which is illustrated in detail in Fig. 3 is formed from a thinner bar of wrought metal in the same manner as the plate member, shown in Fig. 4, and is then cupped, or in other words bent into angular section on a line parallel with its edges, and with the grain of the metal to form an annular flange 14, within which is thus formed a packing recess to fit over and accommodate one of the packing rings and inwardly extending flange portion parallel to the face of the plate member which it engages. The inner surface of the inwardly extending flange portion of the flange member registers with the inner surface of the plate member 10 and is provided with recesses 15, 15 to register with the recesses 12, 12. The flange portion 14 is provided with outwardly curved portions 14$^a$, 14$^a$ adjacent to the recesses 15, 15, substantially concentric to said recesses forming recesses 16, 16 within the flange 14. The plate member and flange member 10, 11 are placed in engagement as shown in Fig. 7, the bottom portion of the flange member 11 resting upon the plate member which reinforces it, the central pipe apertures of the two parts and the recesses 12 and 15 being in registration. The clamping ring can be used in this manner, as shown in Figs. 1 and 2, or the two parts may be united permanently by rivets 17, 17, as shown in Fig. 7 (or by welding, brazing or otherwise, if preferred).

In Fig. 6 I have shown one of the packing rings 20, which has its inner diameter of a size to fit over the pipe, and provided with longitudinal recesses or grooves 21, 21 to accommodate the lock bars. The ring is also provided with a tapering lip 22, a shoulder 23 perpendicular to the axis of the ring and an exterior curved portion 24 formed to fit the recess in the clamping ring. The lip 22 is given an outward curve at 24, 24 around each of the recessed portions 21, 21 and the body of the packing ring, and the shoulder 23 are curved outwardly around each of said recesses 21, as indicated at 25 and 26, the curved portions 24, 25 and 26 being substantially concentric to the adjacent recess 21.

The parts are assembled in connecting two pipe sections, as shown in Fig. 1. A clamping ring and a packing ring are placed on each of the pipe sections and will be held in alinement with each other by the engagement of the lock-bars with the recesses 12, 15 and 21. The middle ring is then placed over the meeting ends of the pipe sections, with the lock bars in the grooves 5, 5, the clamping rings and packing rings are shoved up on the ends of the middle ring, as shown in Fig. 1, the bolts 30 are passed through the plate members 10 and nuts 31 are applied and screwed up to draw the clamping rings toward the middle ring and compress the packing rings in a direction longitudinally of the pipe sections. The construction of the parts of the coupling insures the making of a perfectly tight joint around the pipe and lock bars, and between them and the middle ring.

In Fig. 8 I have shown a slightly modified form of clamping ring in which the flange member 11$^a$ is identical with the flange member 11, previously described, and is provided with the flange 14$^a$, recesses 15$^a$ and 16$^a$ previously described. The plate member 10$^a$ is formed similarly to the plate member 10, but of thinner metal, and is then bent or flanged annularly downwardly and then outwardly on lines parallel with its edges and with the grain of the metal forming an annular shoulder 10$^b$ adjacent to the pipe aperture, which engages the bottom of the flange member, and is provided with the recess 12$^a$ and said shoulder is connected by a cylindrical portion 10$^c$ with an outwardly extending portion 10$^d$, in which the bolt holes 13$^a$ are formed. The two parts may be used as shown, or may be permanently united and this form of ring gives very great strength with lighter weight and thickness of material. In this ring as well as that previously described, the grain of the metal extends in a direction around the pipe aperture.

The specific form of middle ring illustrated and described herein, forms no part of my present invention and is not specifically claimed herein.

What I claim and desire to secure by Letters Patent is:—

1. A clamping ring for rubber packed pipe coupling comprising an annular welded plate member having the grain of the metal extending in a direction around the pipe aperture thereof and the weld extending across the grain, a separately formed annular welded flange member having the grain of the metal extending around the pipe aperture thereof and the weld extending across the grain, said flange member being bent into angular section on a line parallel with its edges, and with the grain of the metal, to form a flange portion parallel to the plate member, and an annular flange projecting on one side of the same to form a packing recess, said plate member being bent into angular section along lines parallel to its edges and to the grain of the metal and forming an inwardly extending flange portion to engage the inwardly extending portion of the flange member, and an outwardly extending flange portion, said flange portions being substantially perpendicular to the axis of the ring, and a cylindrical reinforcing portion between the said flange portions of the plate member.

2. A clamping ring for a coupling for lock-bar pipe comprising a plate member, having its pipe aperture provided with a recess to accommodate a lock bar, a separately formed flange member, having a bottom portion for engaging the plate member, and an annular flange portion disposed substantially perpendicularly to the plate member, the flange member having the inner wall of its pipe aperture provided with a lock-bar recess adapted to register with the lock-bar recess of the plate member, and having its flange portion curved outwardly adjacent to and substantially concentrically to the lockbar recess in said flange member, the said plate member having between its inner and outer edges a reinforcing cylindrical portion perpendicular to the inner and outer portions, and having bolt holes in said outer portions.

3. A clamping ring for a rubber packed pipe coupling, comprising a plate member provided with a central pipe aperture, a separately formed flange member, having a bottom portion for engaging the plate member and provided with a pipe aperture registering with the pipe aperture of said plate member, the flange member having an annular flange portion disposed perpendicularly to the plate member, said plate member having between its inner and outer marginal portions, a reinforcing cylindrical portion substantially perpendicular to its marginal portions and having bolt holes in the outer marginal portions.

4. A clamping ring for rubber packed pipe couplings comprising a plate member formed from a flat bar of wrought metal bent into ring form and welded, the grain of the metal running in a direction around the central pipe aperture in the plate member, a separately formed flange member formed of a flat bar of wrought metal bent into ring form and welded, the grain of the metal running around the pipe aperture thereof, and having its pipe aperture registering with the pipe aperture of the plate member, and having its outer marginal portions bent into the form of an annular flange of greater diameter than the pipe aperture, said plate member having, between its inner and outer marginal portions, an intermediate reinforcing cylindrical portion substantially perpendicular to the marginal portions and being provided with bolt holes in said outer marginal portions.

In testimony whereof I affix my signature, in the presence of two witnesses.

JAMES CLARK.

Witnesses:
M. E. CLARK,
H. M. WICK.

---

Copies of this patent may be obtained for five cents each, by addressing the "Commissioner of Patents, Washington, D. C."